(12) United States Patent
Tallent, Jr. et al.

(10) Patent No.: US 7,000,105 B2
(45) Date of Patent: Feb. 14, 2006

(54) SYSTEM AND METHOD FOR TRANSPARENTLY PROVIDING CERTIFICATE VALIDATION AND OTHER SERVICES WITHIN AN ELECTRONIC TRANSACTION

(75) Inventors: Guy S. Tallent, Jr., Hoboken, NJ (US); Lawrence R. Miller, Redding, CT (US); Khaja E. Ahmed, Pleasanton, CA (US)

(73) Assignee: Identrus, LLC, New York, NY (US)

( * ) Notice: Subject to any disclaimer, the term of this patent is extended or adjusted under 35 U.S.C. 154(b) by 473 days.

(21) Appl. No.: 09/950,315

(22) Filed: Sep. 10, 2001

(65) Prior Publication Data

US 2002/0111913 A1 Aug. 15, 2002

Related U.S. Application Data

(60) Provisional application No. 60/231,317, filed on Sep. 8, 2000.

(51) Int. Cl.
*H04L 9/00* (2006.01)
*G06F 17/60* (2006.01)
*H04K 1/00* (2006.01)

(52) U.S. Cl. ............ 713/156; 713/156; 713/176; 705/44; 705/65; 705/26; 705/27

(58) Field of Classification Search ............ 705/44, 705/65, 26, 27; 713/156, 176
See application file for complete search history.

(56) References Cited

U.S. PATENT DOCUMENTS

| | | | |
|---|---|---|---|
| 5,659,616 A | 8/1997 | Sudia | |
| 5,717,989 A | 2/1998 | Tozzoli et al. | |
| 5,745,574 A | 4/1998 | Muftic | |
| 5,903,882 A | 5/1999 | Asay et al. | |
| 6,092,201 A | 7/2000 | Turnbull et al. | |
| 6,138,107 A | 10/2000 | Elgamal | |
| 6,157,920 A | 12/2000 | Jakobsson et al. | |
| 6,285,991 B1 | 9/2001 | Powar | |
| 6,327,578 B1 * | 12/2001 | Linehan | 705/65 |
| 6,598,027 B1 * | 7/2003 | Breen et al. | 705/26 |
| 6,763,459 B1 * | 7/2004 | Corella | 713/156 |
| 2001/0034724 A1 | 10/2001 | Thieme | |

OTHER PUBLICATIONS

MasterCard Int'l Inc. Operations Manual §§ 5.11-5.14 (Nov. 1993).

* cited by examiner

*Primary Examiner*—Christopher Revak
*Assistant Examiner*—Shin-Hon Chen
(74) *Attorney, Agent, or Firm*—Sonnenschien Nath & Rosenthal LLP

(57) ABSTRACT

A system and method are disclosed for transparently providing certificate validation and other services without requiring a separate service request by either a relying customer or subscribing customer. In a preferred embodiment, after the subscribing customer digitally signs a document (e.g., a commercial document such as a purchase order), it forwards the document to a trusted messaging entity which validates the certificates of both the subscribing customer and relying customer and the respective system participants of which they are customers. If the certificates are valid, the trusted messaging entity appends a validation message to the digitally-signed document and forwards the document to the relying customer. A validation message is also preferably appended to a digitally-signed receipt from the relying customer and transmitted to the subscribing customer. In this way, both the relying customer and subscribing customer obtain certification of their respective counterparty to the transaction.

22 Claims, 12 Drawing Sheets

SYSTEM AND METHOD FOR TRANSPARENTLY PROVIDING CERTIFICATE VALIDATION AND OTHER SERVICES WITHIN AN ELECTRONIC TRANSACTION

This patent application claims priority from U.S. provisional patent application Ser. No. 60/231,317, filed Sep. 8, 2000, entitled Proposed Joint Solution and e-Trust: A Global Solution, which is hereby incorporated by reference.

BACKGROUND OF THE INVENTION

The world of electronic commerce has created new challenges to establishing relationships between contracting parties. One of those challenges springs from the fact that the parties to the transaction cannot see or hear each other, and cannot otherwise easily confirm each other's identity and authority to act.

One remedy for this problem is to provide each contracting party with a private key for signing transmitted messages. The signing party makes available an associated public key that decrypts messages signed with the party's private key, and thus enables a receiving party to confirm the identity of the sender.

But the sender's public key may not be known a priori to the recipient. In that event, the sender may transmit with its signed message a digital certificate issued by a certification authority. The certificate is itself a signed electronic document (signed with the private key of the certification authority) certifying that a particular public key is the public key of the sender.

In some cases, the recipient may be unfamiliar with the public key of the certification authority or may not know whether the certificate is still valid. In that event, the recipient may wish to check the validity of the certificate with an entity that it trusts.

SUMMARY OF THE INVENTION

A system and method are disclosed for transparently providing certificate validation and other services without requiring a separate service request by either a relying customer or subscribing customer. In a preferred embodiment, these services are provided within the context of a four-corner trust model. The four-corner model comprises a subscribing customer (sometimes referred to as the "buyer") and a relying customer (sometimes referred to as the "seller"), who engage in an on-line transaction.

In a preferred embodiment, the buyer is a customer of a first financial institution, referred to as an issuing participant. The issuing participant acts as a certification authority for the buyer and issues the buyer a hardware token including a private key and a digital certificate signed by the issuing participant.

In a preferred embodiment, the seller is a customer of a second financial institution, referred to as the relying participant. The relying participant acts as a certification authority for the seller and issues the seller a hardware token including a private key and a digital certificate signed by the relying participant. The system also includes a root entity that maintains a root certification authority that issues digital certificates to the issuing and relying participants.

In a preferred embodiment, the present system also comprises a trusted messaging entity. The trusted messaging entity is preferably a neutral, trusted third-party that facilitates secure service messaging in the present system.

In a preferred embodiment, after a subscribing customer digitally signs a document (e.g., a commercial document such as a purchase order), it forwards the document to the trusted messaging entity. The trusted messaging entity validates the certificates of subscribing customer, relying customer, issuing participant, and relying participant. In a preferred embodiment, validation requests in the present system are preferably formatted in accordance with the Online Certificate Status Protocol (OCSP).

If all the certificates are valid, the trusted messaging entity appends a validation message to the digitally-signed document and forwards the document to the relying customer. The relying customer generates and digitally signs a receipt and transmits the receipt to the trusted messaging entity. A validation message is also preferably appended to the digitally-signed receipt and transmitted to the subscribing customer. In this way, both the relying customer and subscribing customer obtain certification of their respective counterparty to the transaction.

In a preferred embodiment, all service messages transmitted in the present system are either received, transmitted, and/or forwarded by the trusted messaging entity. The trusted messaging entity preferably time stamps and logs each service message that it sends or receives for non-repudiation purposes.

The trusted messaging entity's logs preferably ensure that other system entities will not be able to repudiate service messages associated with a system service. If, for example, a system participant denies having transmitted a particular service message, the trusted messaging entity's logs may be used to determine whether the message was sent. As such, the trusted messaging entity's logs provide a centralized vehicle for facilitating non-repudiation concerning services provided in the present system.

In a preferred embodiment, a system for providing one or more services via a network comprises:

a root entity, the root entity maintaining a root certification authority adapted to issue digital certificates;

a first participant maintaining a first certification authority adapted to issue a digital certificate to a first customer;

a second participant maintaining a second certification authority adapted to issue a digital certificate to a second customer;

means for receiving by a trusted messaging entity a first digitally-signed message from the first customer;

means for generating by the trusted messaging entity service requests for validation of the first customer's digital certificate, the second customer's digital certificate, and digital certificates issued to the first participant and second participant, respectively, by the root entity;

means for transmitting by the trusted messaging entity the service request for validation of the first customer's digital certificate to the first participant, the service request for validation of the second customer's digital certificate to the second participant, and the validation requests for the first and second participants' digital certificates to the root entity;

means for receiving by the trusted messaging entity responses to the service requests;

means for logging by the trusted messaging entity the received service responses;

means for generating by the trusted messaging entity a second digitally-signed message comprising an indication that the first customer's digital certificate is valid; and means for transmitting by the trusted messaging entity the first and second digitally-signed messages to the second customer.

In a preferred embodiment, a method for providing one or more services via a network comprises:

receiving at a trusted messaging entity a digitally-signed document;

identifying a subscribing customer that digitally signed the document;

identifying an issuing participant associated with the subscribing customer;

identifying a relying customer that is intending to rely on the digitally-signed document;

identifying a relying participant associated with the relying customer;

transmitting a first validation request for a digital certificate of the issuing participant to a root entity;

receiving a validation response for the first validation request from the root entity;

transmitting a second validation request for a digital certificate of the subscribing customer to the issuing participant;

receiving a validation response for the second validation request from the issuing participant;

transmitting a third validation request for a digital certificate of the relying participant to the root entity;

receiving a validation response for the third validation request from the root entity;

transmitting a fourth validation request for a digital certificate of the relying customer to the relying participant;

receiving a validation response for the fourth validation request from the relying participant;

determining whether the first, second, third, and fourth validation responses are positive;

if the first, second, third, and fourth validation responses are positive, creating a first digitally-signed message that indicates the validity of the subscribing-customer digital certificate; and transmitting the digitally-signed document and the first digitally-signed message to the relying customer.

In a preferred embodiment, the first and second validation requests may be signed with a private key associated with a certificate that names the relying participant and the third and fourth validation requests may be signed with a private key associated with a certificate that names the issuing participant. The four validation requests may preferably be made by the trusted messaging entity acting on behalf of a disclosed principal. The disclosed principal for the first and second validation requests may preferably be the relying participant and the disclosed principal for the third and fourth validation requests may preferably be the issuing participant.

In a preferred embodiment, the four validation requests may be signed with a private key associated with a certificate issued to the trusted messaging entity. The trusted messaging entity may be acting as a principal in the system or as an agent for an undisclosed principal with respect to these requests.

In a preferred embodiment, the first-digitally signed message may be signed with a private key associated with a certificate that names the relying participant. The trusted messaging entity may be acting as an agent for a disclosed principal with respect to this message which may preferably be the relying participant.

In a preferred embodiment, a method for providing one or more services via a network comprises:

providing a trusted messaging entity with a first certificate that names a first participant and a second certificate that names a second participant;

creating a first message;

signing by the trusted messaging entity the first message with a private key associated with the first certificate;

transmitting the first message by the trusted messaging entity, whereby the trusted messaging entity acts as an agent for a disclosed principal that is the first participant;

creating a second message;

signing by the trusted messaging entity the second message with a private key associated with the second certificate; and transmitting the second message by the trusted messaging entity, whereby the trusted messaging entity acts as an agent for a disclosed principal that is the second participant.

In a preferred embodiment the first and second messages may be validation requests. In a preferred embodiment, the first and second messages may be transmitted to the root entity. In a preferred embodiment, the first message may be transmitted to the second participant and the second message may be transmitted to the first participant.

The features and advantages described in the specification are not all inclusive, and many additional features and advantages will be apparent to one of ordinary skill in the art in view of the drawings, specification, and claims hereof.

BRIEF DESCRIPTION OF THE DRAWINGS

The above summary of the invention will be better understood when taken in conjunction with the following detailed description and accompanying drawings, in which.

DETAILED DESCRIPTION OF THE PREFERRED EMBODIMENTS

The present disclosure relates to a system and method for transparently providing certificate validation and other services without requiring a separate service request by either a relying customer or subscribing customer. In a preferred embodiment, this service is performed within the context of a four-corner trust model that comprises a neutral, trusted third party. A preferred embodiment of this four-corner model is shown in FIG. 1.

Figure 1:
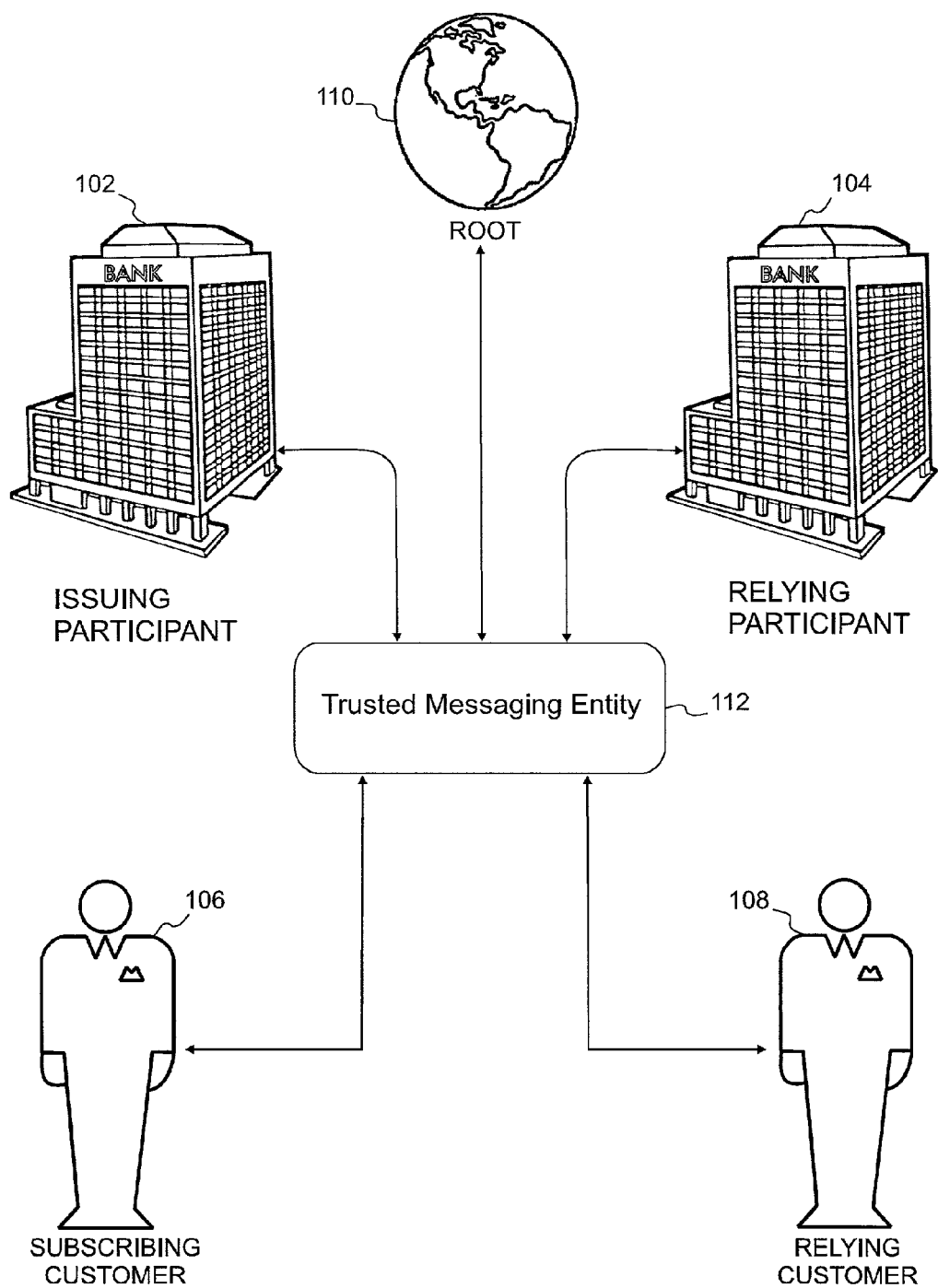
FIG. 1 is a block diagram of a preferred embodiment of a four-corner model comprising a trusted messaging entity.

As shown in FIG. 1, the four-corner model preferably comprises a first institution 102 and a second institution 104. First institution 102 is referred to as the "issuing participant" because it is a participant in the present system and issues to its customers tokens that include a private key and a digital certificate signed by the issuing participant, as described below. Second institution 104 is referred to as the "relying participant" because it is a participant in the present system and its customers rely on representations made by issuing participant 102 and issuing participant 102's customers, as described below. Participants 102, 104 may preferably be banks or other financial institutions.

Also shown in FIG. 1 are a first customer 106 and a second customer 108. First customer 106 and second customer 108 are preferably customers of issuing participant 102 and relying participant 104, respectively. First customer 106 is sometimes referred to as the "subscribing customer" because it subscribes to services provided by issuing participant 102. First customer 106 is sometimes referred to as the "buyer" because it typically fills that role in transactions with second customer 108, as described below.

Second customer 108 is referred to as the "relying customer" because it relies on representations made by other system entities. Second customer 108 is also sometimes referred to as the "seller" because it typically fills that role in transactions with first customer 106, as described below. It should be recognized, however, that although the description below speaks primarily in terms of a buyer 106 and a seller 108, first customer 106 and second customer 108 may instead have different roles in a given transaction. For example, first customer 106 may be a borrower repaying a loan to second customer 108.

Also shown in FIG. 1 is a root entity 110. Root entity 110 is preferably an organization that establishes and enforces a common set of operating rules for facilitating electronic commerce and electronic communications. The operating rules preferably define the rights, obligations, and liabilities of each system entity in connection with provision of system services. Root entity 110 may be owned jointly by a plurality of banks and/or other financial institutions that have agreed to adhere to these operating rules. One exemplary embodiment of such a root entity is described in copending U.S. application Ser. No. 09/502,450, filed Feb. 11, 2000, entitled System and Method for Providing Certification Related and Other Services and in copending U.S. application Ser. No. 09/657,623, filed Sep. 8, 2000, entitled System and Method for Providing Certificate-Related and Other Services, which are hereby incorporated by reference.

In a preferred embodiment, the system of FIG. 1 also comprises a trusted messaging entity 112. Trusted messaging entity 112 is preferably a neutral, trusted third-party that facilitates secure service messaging in the present system. As described below, in a preferred embodiment, all service messages used in the present system are either received, transmitted, or forwarded by trusted messaging entity 112.

In a preferred embodiment, trusted messaging entity 112 time stamps and logs each service message that it sends or receives, for non-repudiation purposes. If a dispute arises between system entities, the information stored by trusted messaging entity 112 may be used to resolve the dispute.

Logging all service messages with a neutral entity facilitates non-repudiation in the present system. Without such logging, service-message logs relating to system services would be fragmented across the logs of a plurality of system entities. By contrast, logging all service messages at a single entity provides a consolidated log and enables full non-repudiation of all messages relating to a system service.

It should be noted that, in preferred embodiments of the present system, participants 102, 104, root entity 110, relying customer 108, and/or subscribing customer 106 may also choose to log service messages that they send or receive. In a preferred embodiment, however, trusted messaging entity 112's logs remain the primary vehicle for resolving disputes between other system entities relating to the system services described below.

As will be recognized, although the preferred embodiments described below speak primarily in terms of customer 106 acting as a subscribing customer and customer 108 acting as a relying customer, the roles of these two customers may at times be reversed, even within a single transaction and with respect to a single document. For example, in connection with a particular transaction, customers 106, 108 may prepare a contract to be signed by both parties. With respect to customer 106's signature on the contract, customer 106 is the subscribing customer and customer 108 is the relying customer. By contrast, with respect to customer 108's signature on the contract, customer 108 is the subscribing customer and customer 106 is the relying customer.

Figure 2:
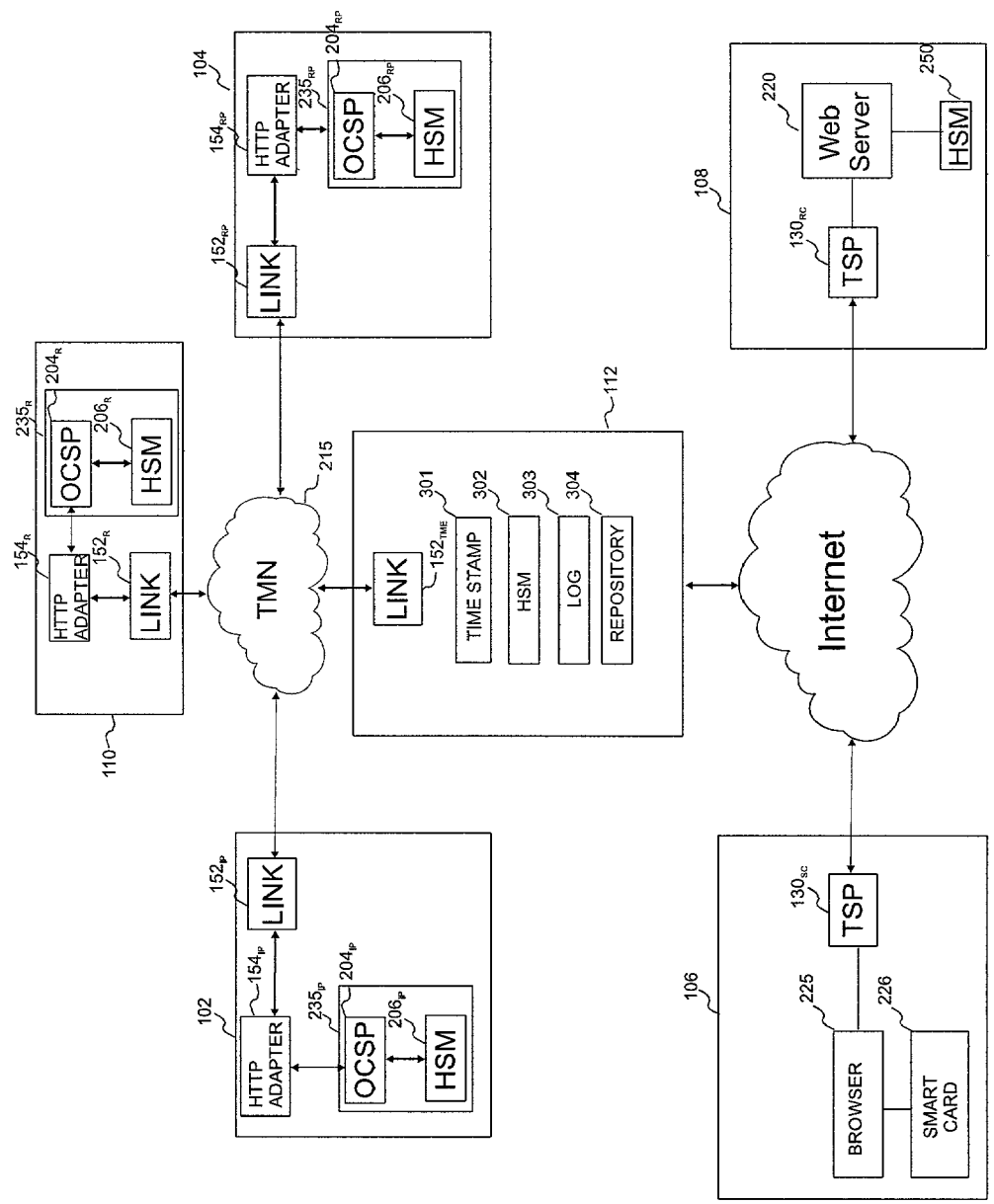
FIG. 2 is a block diagram illustrating components provided at entities in the four-corner model of FIG. 1 in a preferred embodiment of the present system.
Figure 3A:
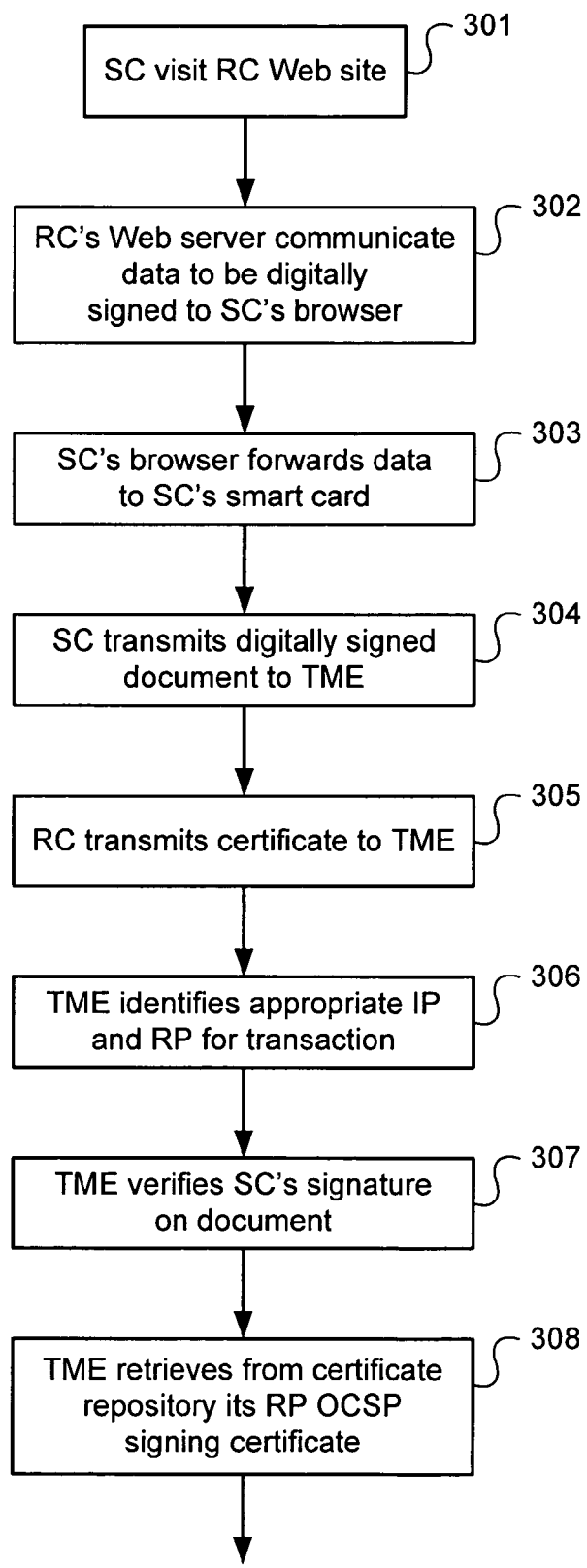
FIG. 3 illustrates a first preferred embodiment of a certificate validation process flow.
Figure 3B:
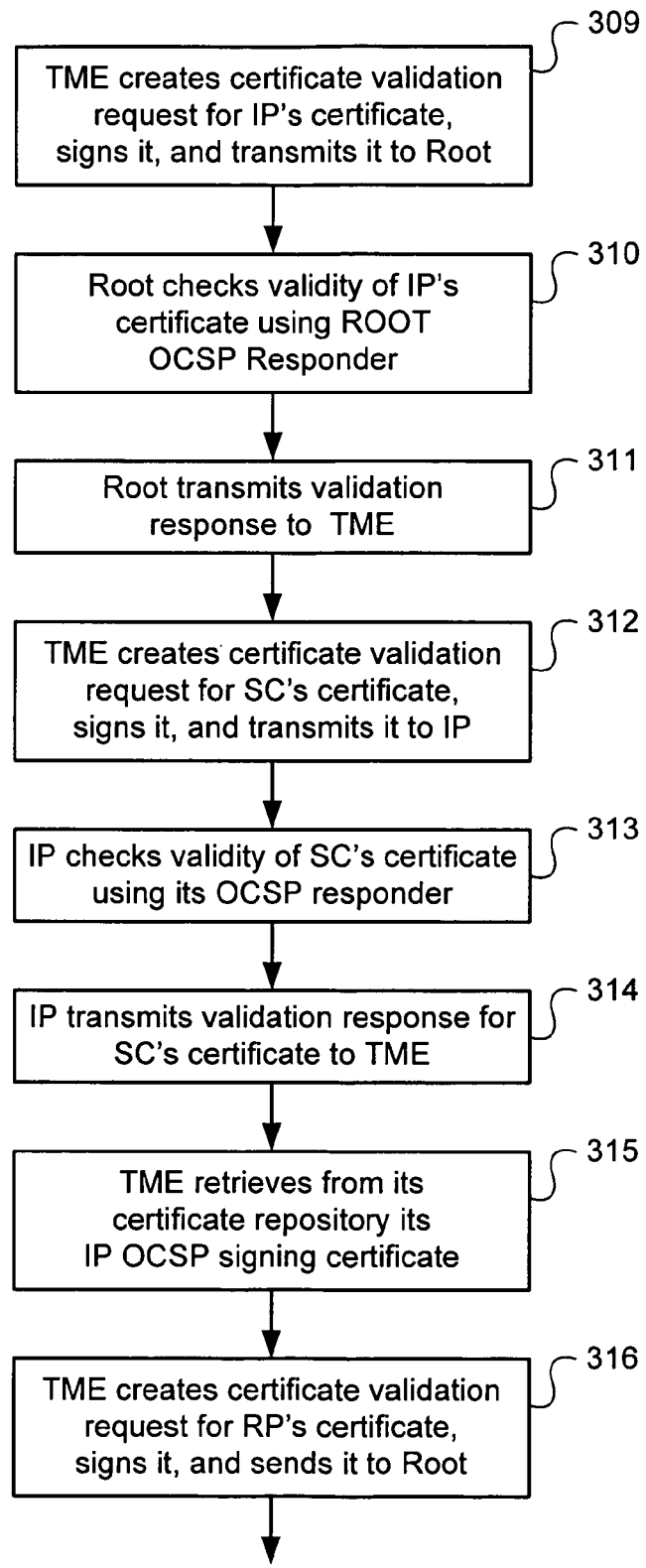
Figure 3C:
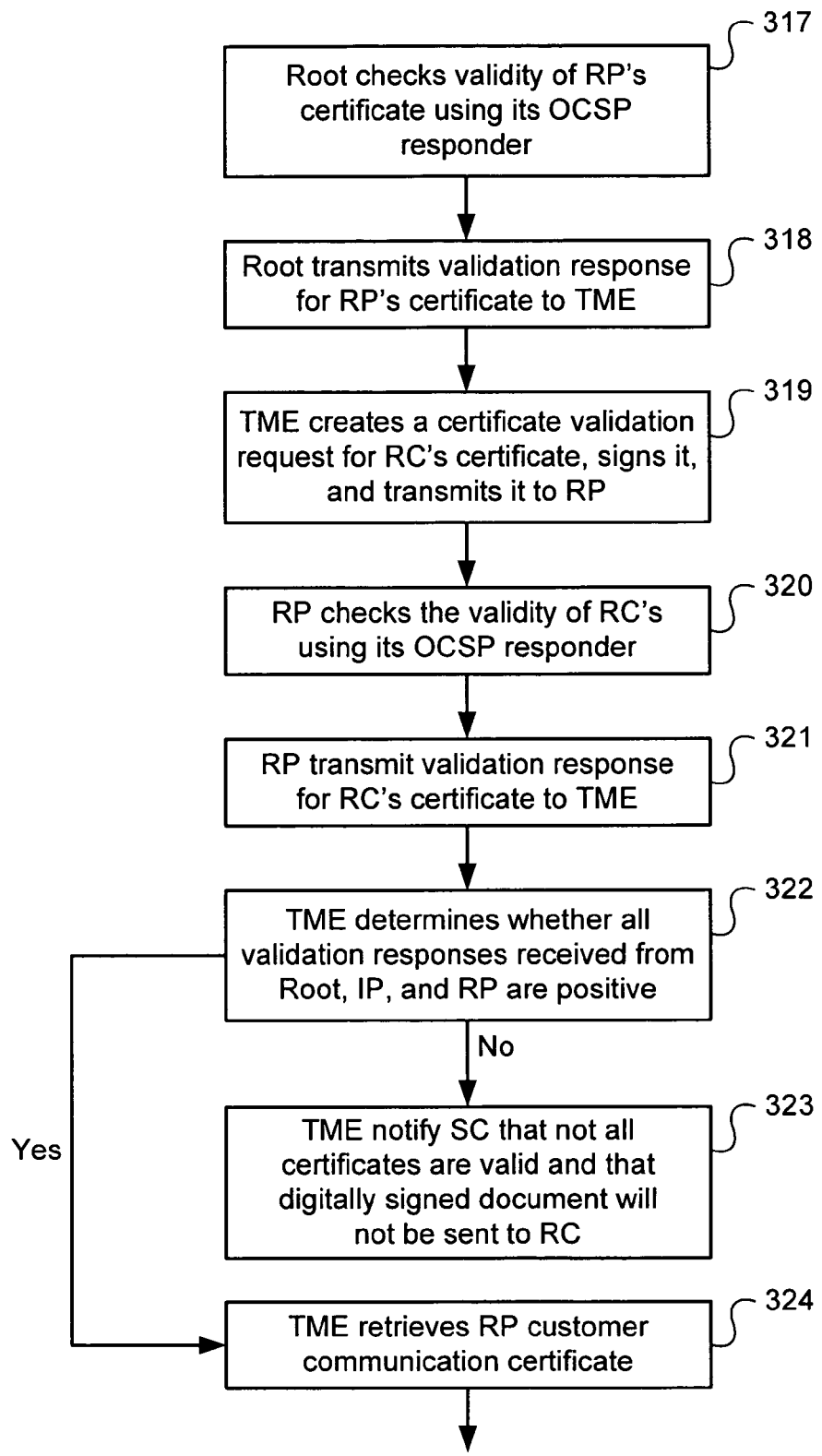
Figure 3D:
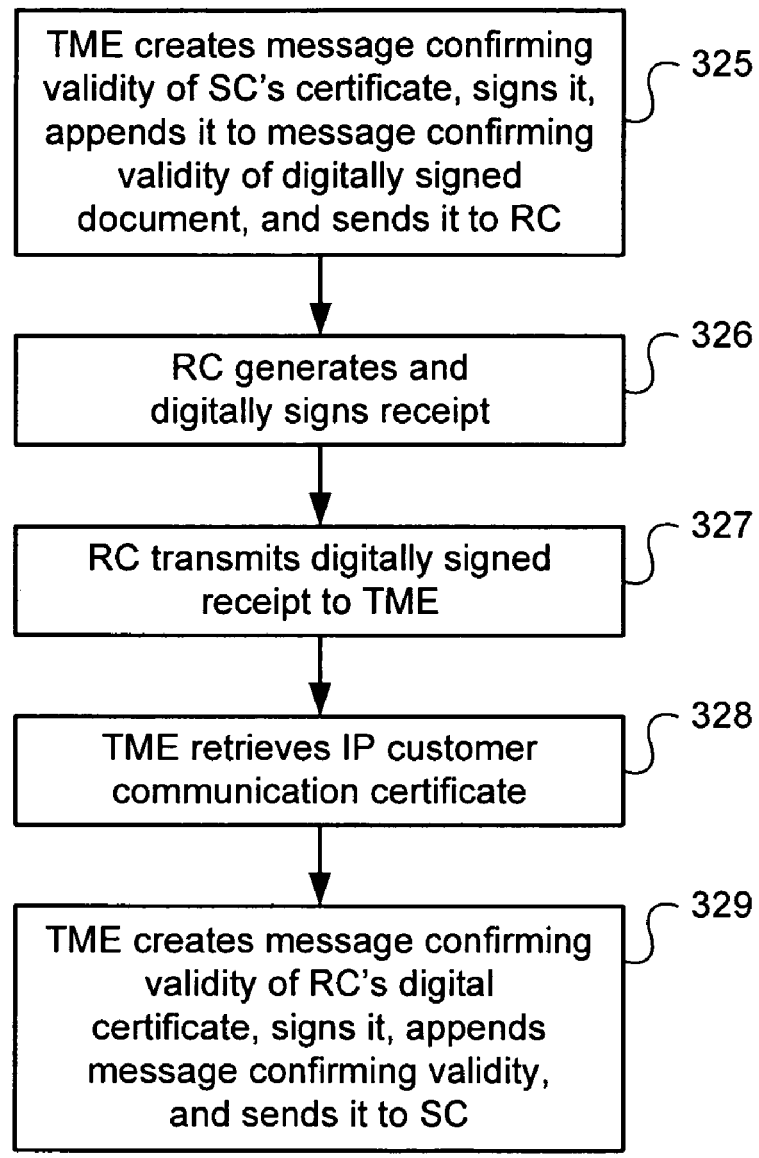

FIG. 2 is a block diagram illustrating components provided at entities in a preferred embodiment of the present system. As shown in FIG. 2, participants 102, 104, and root entity 110 are each preferably provided with a computer system 235 that is adapted to receive and transmit information over a communication network and conduct processing for providing system services, as described below. Each computer system 235 preferably comprises an OCSP responder 204 for validating digital certificates and an associated hardware security module (HSM) 206 for verifying signatures on validation requests and signing validation responses.

Participants 102, 104, and root entity 110 are also each preferably provided with a link 152 for communicating with trusted messaging entity 112 over a trusted messaging network 215. An HTTP adaptor 154 is provided to integrate link 152 into public key infrastructure (PKI) applications running on computer systems 235 written for use with HTTP, such as validation applications run by OCSP responders 204.

Trusted messaging entity 112 is preferably provided with a time stamp component 301 adapted to time stamp service messages that it sends and receives. Trusted messaging entity 112 is also preferably provided with an HSM 302 for signing and verifying signatures on messages and with a log 303 used to log all service messages sent or received by trusted messaging entity 112, as described below.

In a preferred embodiment, trusted messaging entity 112 is also preferably provided with a certificate repository 304 for storing all digital certificates issued to it by root entity 110 and system participants (e.g., participants 102, 104). Trusted messaging entity 112 uses these certificates to digitally sign service messages that it creates, as described in more detail below.

Subscribing customer 106 is preferably provided with a Web browser 224 adapted to receive and transmit information via the Internet. Subscribing customer 106 is also preferably provided with a smartcard subsystem 226 adapted to sign electronic messages. In a preferred embodiment, smartcard subsystem 226 may include a smartcard reader, a smartcard driver, a smartcard token, and other software, as described in U.S. provisional application Ser. No. 60/224,994, filed Aug. 14, 2000, entitled Signing Interface Requirements, Smart Card Compliance Requirements, Warranty Service Functional Requirements, and Additional Disclosure and copending U.S. application Ser. No. 09/928,999, filed Aug. 14, 2001, entitled System and Method for Secure Smartcard Issuance, which are hereby incorporated by reference.

Relying customer 108 is preferably provided with a Web server 220 adapted to receive and transmit information (including serving Web pages) over a communication network, such as the Internet. Web server 220 is preferably provided with an associated HSM 250 for signing and verifying signatures on messages.

In a preferred embodiment, subscribing customer 106 and relying customer 108 are also each preferably provided with a trusted services platform 130. Trusted services platform 130 is preferably software developed jointly by root entity 110 and trusted messaging entity 112 that is adapted to provide a secure network connection for subscribing customer 106 and relying customer 108 to communicate with trusted messaging entity 112.

In a preferred embodiment, service messages transmitted to or from trusted messaging entity 112 by or to subscribing customer 106 or relying customer 108 are sent over the Internet via trusted services platform 130. Other messages between customers 106, 108 that do not relate to requesting or receiving system services (for example, messages from one customer to another during negotiation of a contract or conveying a contract to be signed) may preferably be transmitted directly from one customer to another via, for example, the Internet or other network without using trusted services platform 130 or routing the messages via trusted messaging entity 112, as described below.

In a preferred embodiment, each system entity is preferably provided with at least two digital certificates (and corresponding private keys) to facilitate authentication: an identity certificate and a utility certificate.

The identity private key is used to produce digital signatures that are required by root entity 110 as evidence of an entity's contractual commitment to the contents of an electronic transaction, such as a purchase order.

The utility private key is used to provide additional transactional security. Typically, utility certificates are used to support secure socket layers (SSL), to sign secure multipurpose internet mail extension (S/MIME) messages, and for other utility applications. Any reference in this document to the term "certificate" refers to an identity certificate unless otherwise stated.

In a preferred embodiment, root entity 110, in its capacity as a certification authority, uses a root private key to create the digital certificates of each system participant (e.g., issuing participant 102 and relying participant 104) and trusted messaging entity 112. In addition, it uses the root private key to create digital certificates for each system component maintained by root entity 110 that has digital signing capability, such as OCSP responder $204_R$.

In addition, each system participant (e.g., issuing participant 102 and relying participant 104), in its capacity as a certification authority, uses the private key associated with its certificate from root entity 110 to create the digital certificates of its customers (e.g., subscribing customer 106 and relying customer 108). In addition, it uses this private key to create digital certificates for each system component that it maintains that has digital signing capability, such as its OCSP responder 204. In an alternative embodiment, the digital certificates for system components with digital signing capability that are maintained by a participant may be issued by root entity 110.

It should be noted that each customer 106, 108, may be a business entity, such as a corporation, that employs many individuals. In such cases, customers 106, 108 preferably authorize some or all of these individual employees to transact and utilize system services on their behalf. Issuing participant 102 preferably issues a separate smartcard token having a distinct private key and associated digital certificate to each authorized employee of subscribing customer 106. Similarly, relying participant 104 (in its capacity as "issuing participant" to relying customer 108) preferably issues a separate smartcard token having a distinct private key and associated digital certificate to each authorized employee of relying customer 108. The digital certificates preferably include the individual employee's name and identify the customer for whom he or she works. In an alternative embodiment, the private key may instead be included in a software token provided to the individual.

It should be recognized that although the description that follows speaks primarily in terms of messages or other data being signed by a "subscribing customer" or "relying customer," the signature may in fact typically be created by an individual employee using his or her digital certificate and associated private key acting in a representative capacity for his or her employer.

In a preferred embodiment, each system participant (e.g., participants 102, 104) uses the private key associated with its digital certificate from root entity 110 to create a customer-communication certificate for use by trusted messaging entity 110. The participants forward these certificates to trusted messaging entity 112 which stores them in certificate repository 304. As described below, trusted messaging entity 112 uses the customer-communication certificate from a particular system participant when communicating with the participant's customers.

In an alternative embodiment, these customer-communication digital certificates may be issued by root entity 110 as long as each certificate names a specific system participant so that messages signed with the private key associated with the certificate that are sent by trusted messaging entity 112 to the participant's customers will be associated by the customer with its participant and/or recognized by the customer as having been sent on behalf of its participant.

In addition, in one preferred embodiment, each system participant (e.g., participants 102, 104) uses the private key associated with its digital certificate from root entity 110 to create an OCSP-signing certificate for use by trusted messaging entity 112. The participants forward these certificates to trusted messaging entity 112 which stores them in certificate repository 304. Trusted messaging entity 112 uses the OCSP-signing certificate from a particular participant to sign validation requests when acting as an agent for the participant in the first preferred embodiment for providing a certificate validation service, described below. If desired, a single certificate may be issued to trusted messaging entity 112 which may serve as both a customer-communication certificate and an OCSP-signing certificate.

In an alternative embodiment, these OCSP-signing digital certificates may be issued by root entity 110 as long as each certificate names a specific system participant so that messages signed with the private key associated with the certificate that are sent by trusted messaging entity 112 to other system participants or root entity 110 will be associated by the message recipient with the participant and/or recognized by the message recipient as having been sent on behalf of the participant.

In a second preferred embodiment, root entity 110 uses the root private key to create an OCSP-signing certificate for use by trusted messaging entity 112. Root entity 110 forwards this certificate to trusted messaging entity 112 which stores it in certificate repository 304. Trusted messaging entity 112 uses the OCSP-signing certificate issued by root entity 110 to sign validation requests in the second preferred embodiment for providing a certificate validation service, described below.

It should be noted that the system entities may each be provided with additional components not shown in FIG. 2, such as the components described in copending U.S. application Ser. No. 09/657,605, filed on Sep. 8, 2000, entitled System and Method for Providing Certificate Validation and Other Services, U.S. provisional application Ser. No. 60/224,994, filed Aug. 14, 2000, entitled Signing Interface Requirements, Smart Card Compliance Requirements, Warranty Service Functional Requirements, and Additional Disclosure, U.S. provisional application Ser. No. 60/259,796, filed Jan. 4, 2001, entitled Warranty Manager Application Programming Interface, Warranty Messaging Specification, and Warranty Manager Functional Requirements, copending U.S. application Ser. No. 09/928,998, filed Aug. 14, 2001, entitled System and Method for Providing Warranties in Electronic Commerce, copending U.S. application Ser. No. 09/928,999, filed Aug. 14, 2001, entitled System and Method for Secure Smartcard Issuance, and copending U.S. application Ser. No. 09/929,035, filed Aug. 14, 2001, entitled System and Method for Facilitating Signing by Buyers in Electronic Commerce, which are hereby incorporated by reference.

In a preferred embodiment, the architecture described above may be used to provide a plurality of system services to customers 106, 108. Preferred embodiments for providing one such service, a certificate validation service, are described below. In a preferred embodiment, all service messages described in connection with the following preferred embodiments are digitally-signed by the message sender using an appropriate private key associated with a digital certificate issued to the message sender.

Preferred Embodiment No. 1

A first preferred embodiment for providing a certificate validation service is described in connection with FIGS. 3–4. Beginning with FIG. 3, in step 301, a subscribing customer 106 visits a relying customer 108's Web site. The parties preferably authenticate themselves to each other over an SSL session with their utility keys.

In step 302, Web server 220 communicates data to be digitally signed to browser 224 (e.g., a purchase order for an agreed-to transaction). In a preferred embodiment, Web server 220 may also communicate to browser 224 a copy of relying customer 108's digital certificate, either as part of the data to be signed or separately.

In step 303, the data to be signed is forwarded to smartcard subsystem 226 which signs the data to create a digitally-signed document. The digitally-signed document preferably includes a copy of subscribing customer 106's digital certificate.

Figure 4:
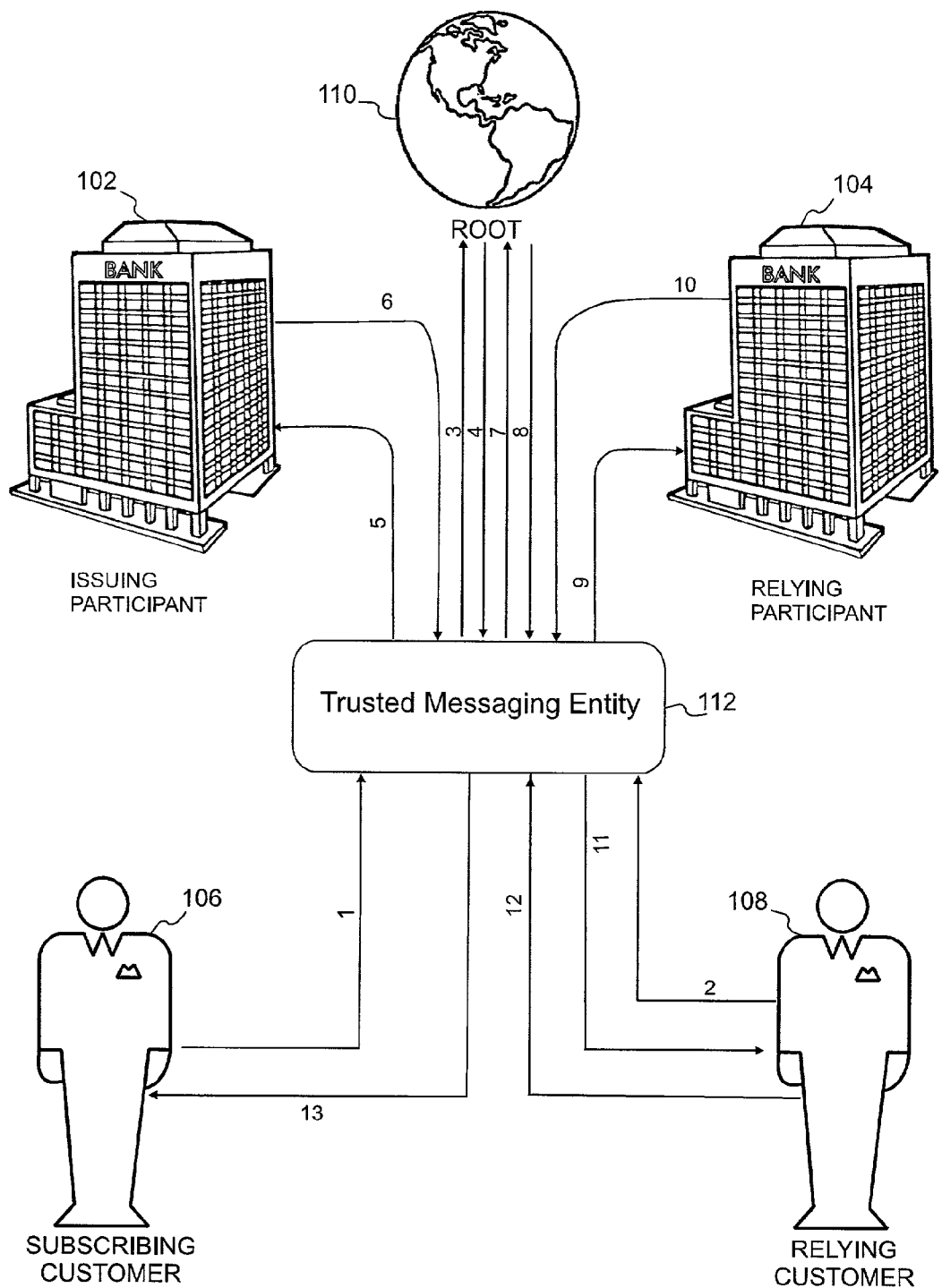
FIG. 4 illustrates a preferred embodiment of certain messages used in the preferred embodiment of FIG. 3.
Figure 5A:
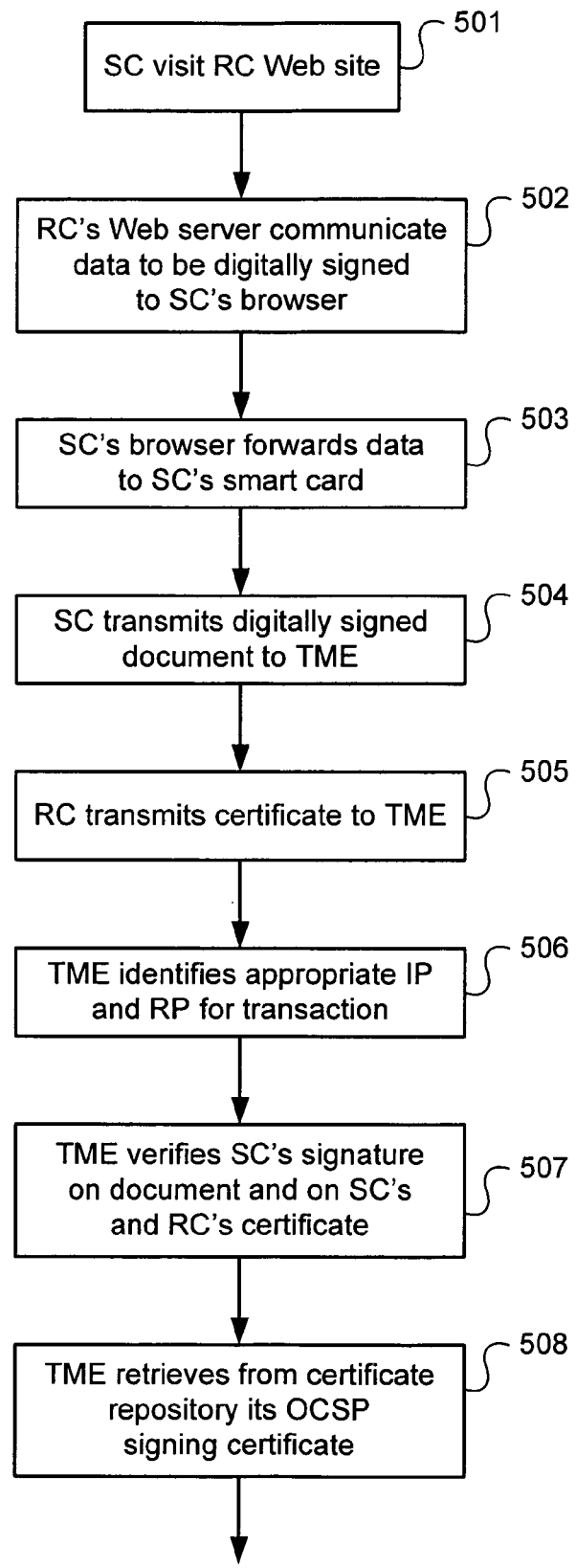
FIG. 5 illustrates a second preferred embodiment of a certificate validation process flow.
Figure 5B:
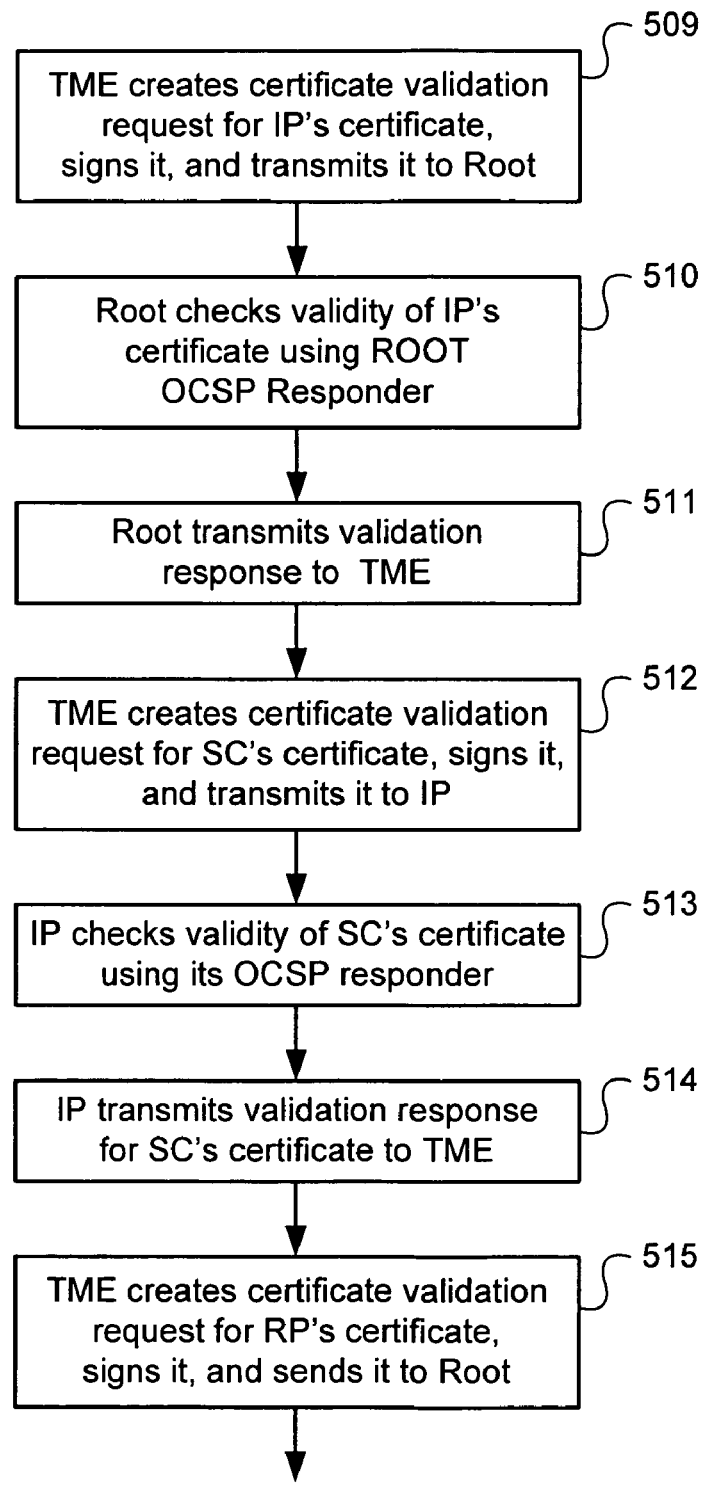
Figure 5C:
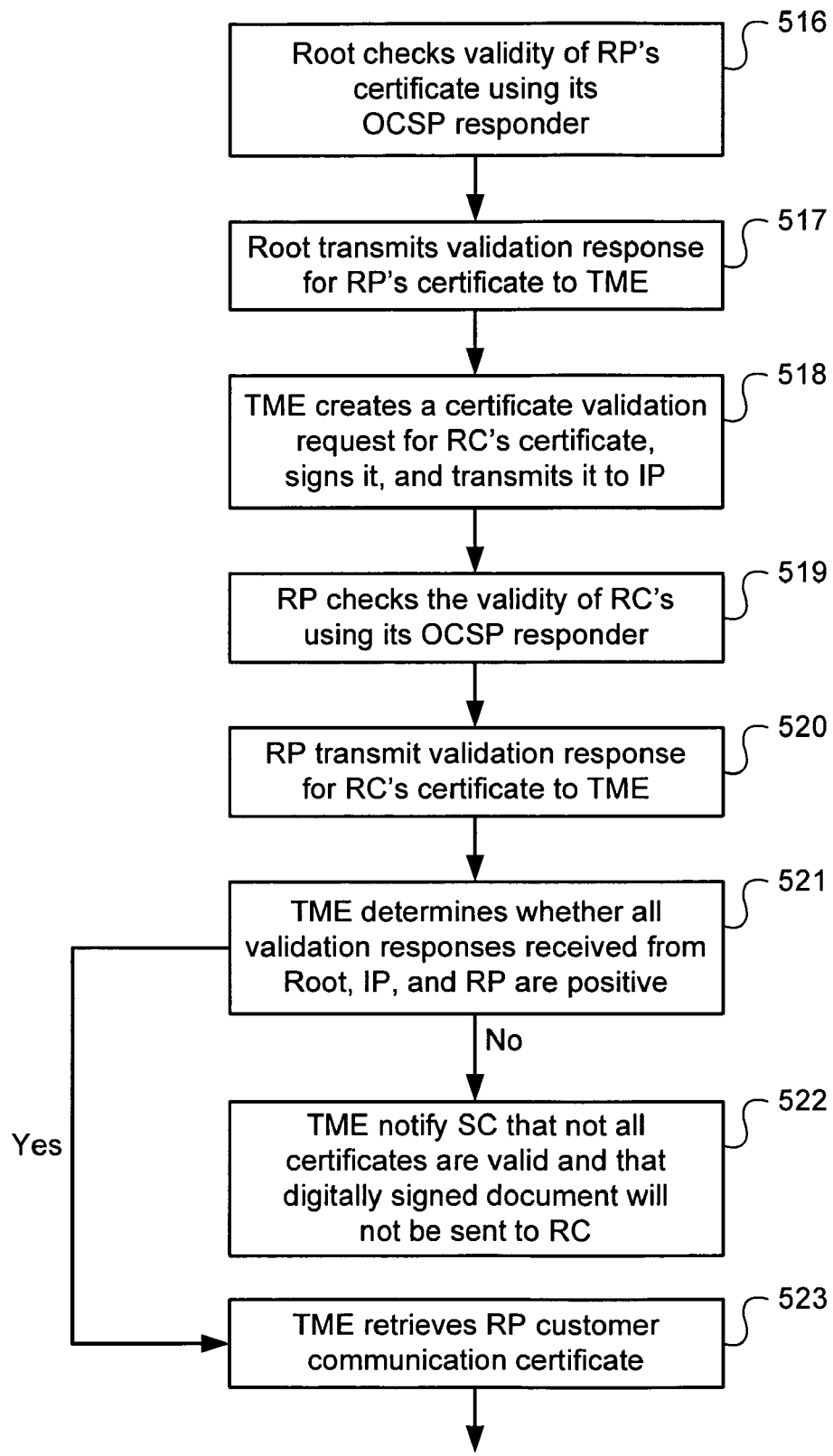
Figure 5D:
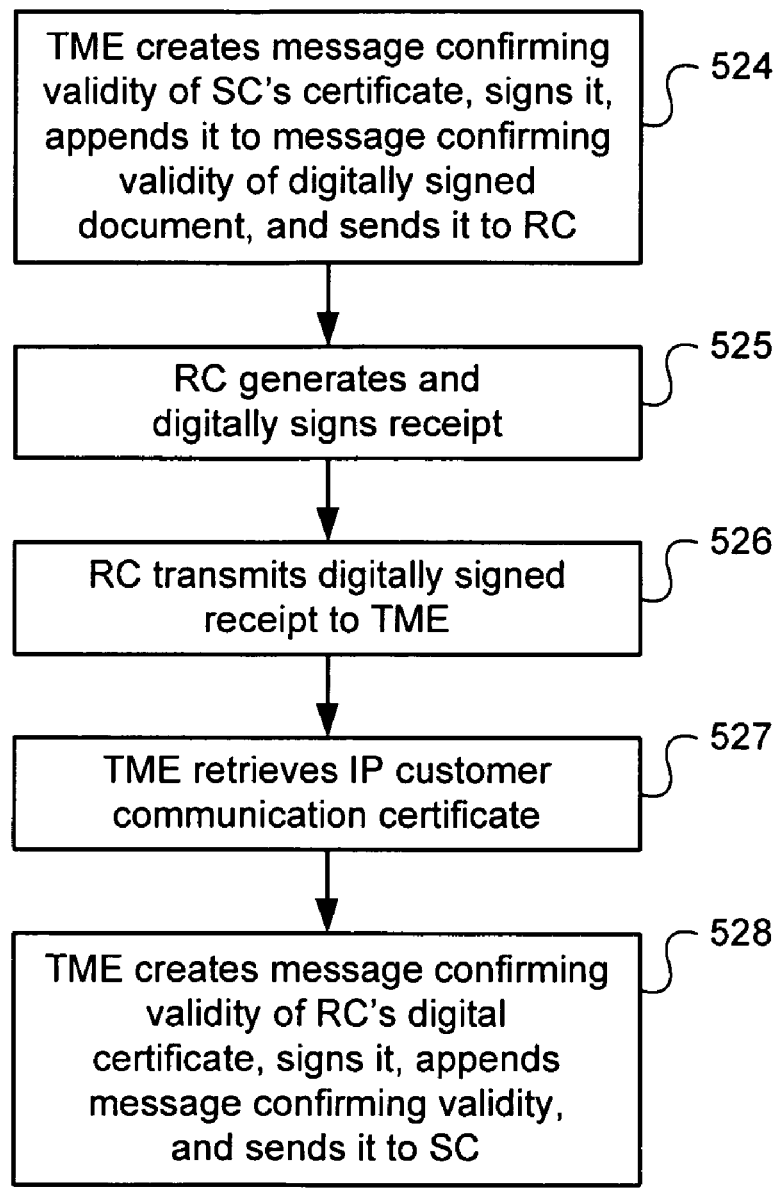

In step 304, browser 224 transmits the digitally-signed document to trusted messaging entity 112 over the Internet via trusted services platform 130$_{SC}$ (message 1 in FIG. 4). If, in step 303 above, subscribing customer 106 received a copy of relying customer 108's digital certificate with, or as part of, the data to be signed, subscribing customer 106 includes this certificate with the digitally-signed document transmitted to trusted messaging entity 112. Otherwise, in step 305, relying customer 108 transmits a copy of its certificate directly to trusted messaging entity 112 (message 2 in FIG. 4).

In step 306, trusted messaging entity 112 identifies the issuing participant and relying participant for the particular transaction from the subscribing customer and relying customer certificates, respectively. In step 307, trusted messaging entity 112 verifies subscribing customer 106's signature on the document (using subscribing customer 106's public key) and the signatures on subscribing customer 106's and relying customer 108's certificates (using the public keys of issuing participant 102 and relying participant 104, respectively).

In step 308, trusted messaging entity 112 retrieves from certificate repository 304 its OCSP-signing certificate issued to it by the relying participant 104 (hereafter "RP-OCSP-signing certificate"). In step 309, trusted messaging entity 112 creates a certificate validation request for issuing participant 102's certificate, signs the request with the private key associated with its RP-OCSP-signing certificate and transmits the request to root entity 110 (message 3 in FIG. 4). In requesting this validation, trusted messaging entity 112 preferably acts as an agent for relying participant 108.

In step 310, root entity 110 checks the validity of the issuing participant 102's certificate using its OCSP responder 204$_R$. In step 311, root entity 110 transmits the validation response for this certificate to trusted messaging entity 112 (message 4 in FIG. 4).

In step 312, trusted messaging entity 112 creates a certificate validation request for subscribing customer 106's certificate, signs the request with the private key associated with its RP-OCSP-signing certificate and transmits the request to issuing participant 102 (message 5 in FIG. 4). In requesting this validation, trusted messaging entity 112 preferably acts as an agent for relying participant 108.

In step 313, issuing participant 102 checks the validity of subscribing customer 106's certificate using its OCSP responder 204$_{IP}$. In step 314, issuing participant 102 transmits the validation response for this certificate to trusted messaging entity 112 (message 6 in FIG. 4).

In step 315, trusted messaging entity 112 retrieves from certificate repository 304 its OCSP-signing certificate issued to it by issuing participant 102 (hereafter "IP-OCSP-signing certificate"). In step 316, trusted messaging entity 112 creates a certificate validation request for relying participant 104's certificate, signs the request with the private key associated with its IP-OCSP-signing certificate and transmits the request to root entity 110 (message 7 in FIG. 4). In requesting this validation, trusted messaging entity 112 preferably acts as an agent for issuing participant 102.

In step 317, root entity 110 checks the validity of the relying participant 104's certificate using its OCSP responder 204$_R$. In step 318, root entity 110 transmits the validation response for this certificate to trusted messaging entity 112 (message 8 in FIG. 4).

In step 319, trusted messaging entity 112 creates a certificate validation request for relying customer 108's certificate, signs the request with the private key associated with its IP-OCSP-signing certificate and transmits the request to relying participant 104 (message 9 in FIG. 4). In requesting this validation, trusted messaging entity 112 preferably acts as an agent for issuing participant 102.

In step 320, relying participant 104 checks the validity of relying customer 108's certificate using its OCSP responder 204$_{RP}$. In step 321, relying participant 104 transmits the validation response for this certificate to trusted messaging entity 112 (message 10 in FIG. 4).

In step 322, trusted messaging entity 112 determines whether the validation responses received from root entity 110, issuing participant 102, and relying participant 104 are positive (i.e., indicate that the certificates that were the subjects of the requests were "valid"). If one or more of the validation responses are not positive (i.e., indicate that one or more of the certificates that were the subjects of the requests were "revoked," "suspended," or "unknown"), trusted messaging entity 112 transmits a message (not shown) to subscribing customer 106 conveying this fact and informing subscribing customer 106 that its digitally-signed document will not be delivered to relying customer 108 (step 323).

Otherwise, in step 324, trusted messaging entity 112 retrieves from certificate repository 304 the customer-communication certificate issued to it by relying participant 104 (hereafter "RP-customer-communication certificate"). In step 325, trusted messaging entity creates a message confirming the validity of the subscribing customer 106's digital certificate, signs the message with the private key corresponding to its RP-customer-communication certificate, appends the message confirming validity to the digitally-signed document to form a validated document, and transmits the validated document to relying customer 108 (message 11 in FIG. 4). In signing this message, trusted messaging entity 112 preferably acts as an agent for relying participant 104.

In a preferred embodiment, validation messages generated by trusted messaging entity 112 may be implemented as wrappers that include a digital signature generated by trusted messaging entity 112 and other validation-related information that is wrapped around a customer's digitally-signed message (e.g., a document from subscribing customer 106 or a receipt from relying customer 108). In this case, a hash created by trusted messaging entity 112 in generating the digital signature may preferably be based at least in part on the customer's digitally-signed message.

In step 326, relying customer 108 generates a receipt for the transaction and digitally signs it. In step 327, relying customer 108 transmits the digitally-signed receipt to trusted messaging entity 112 (message 12 in FIG. 4).

In step 328, trusted messaging entity 112 retrieves from certificate repository 304 its customer-communication certificate issued to it by issuing participant 102 (hereafter "IP-customer-communication certificate"). In step 329, trusted messaging entity creates a message confirming the validity of the relying customer 108's digital certificate, signs the message with the private key corresponding to its IP-customer-communication certificate, appends the message confirming validity to the digitally-signed receipt to form a validated receipt, and transmits the validated receipt to subscribing customer 106 (message 13 in FIG. 4). In signing this message, trusted messaging entity 112 preferably acts as an agent for issuing participant 102. In a preferred embodiment, trusted messaging entity 112 may revalidate the relying customer's certificate with relying participant 104 before generating the validated receipt and forwarding it to subscribing customer 106.

Preferred Embodiment No. 2

A second preferred embodiment for providing a certificate validation service is described in connection with FIGS. 5–6. Beginning with FIG. 5, in step 501, a subscribing customer 106 visits relying customer 108's Web site. The parties preferably authenticate themselves to each other over an SSL session with their utility keys.

In step 502, Web server 220 communicates data to be digitally signed to browser 224 (e.g., a purchase order for an agreed-to transaction). In a preferred embodiment, Web server 220 may also communicate to browser 224 a copy of relying customer 108's digital certificate, either as part of the data to be signed or separately.

In step 503, the data to be signed is forwarded to smart-card subsystem 226 which signs the data to create a digitally-signed document. The digitally-signed document preferably includes a copy of subscribing customer 106's digital certificate.

Figure 6:
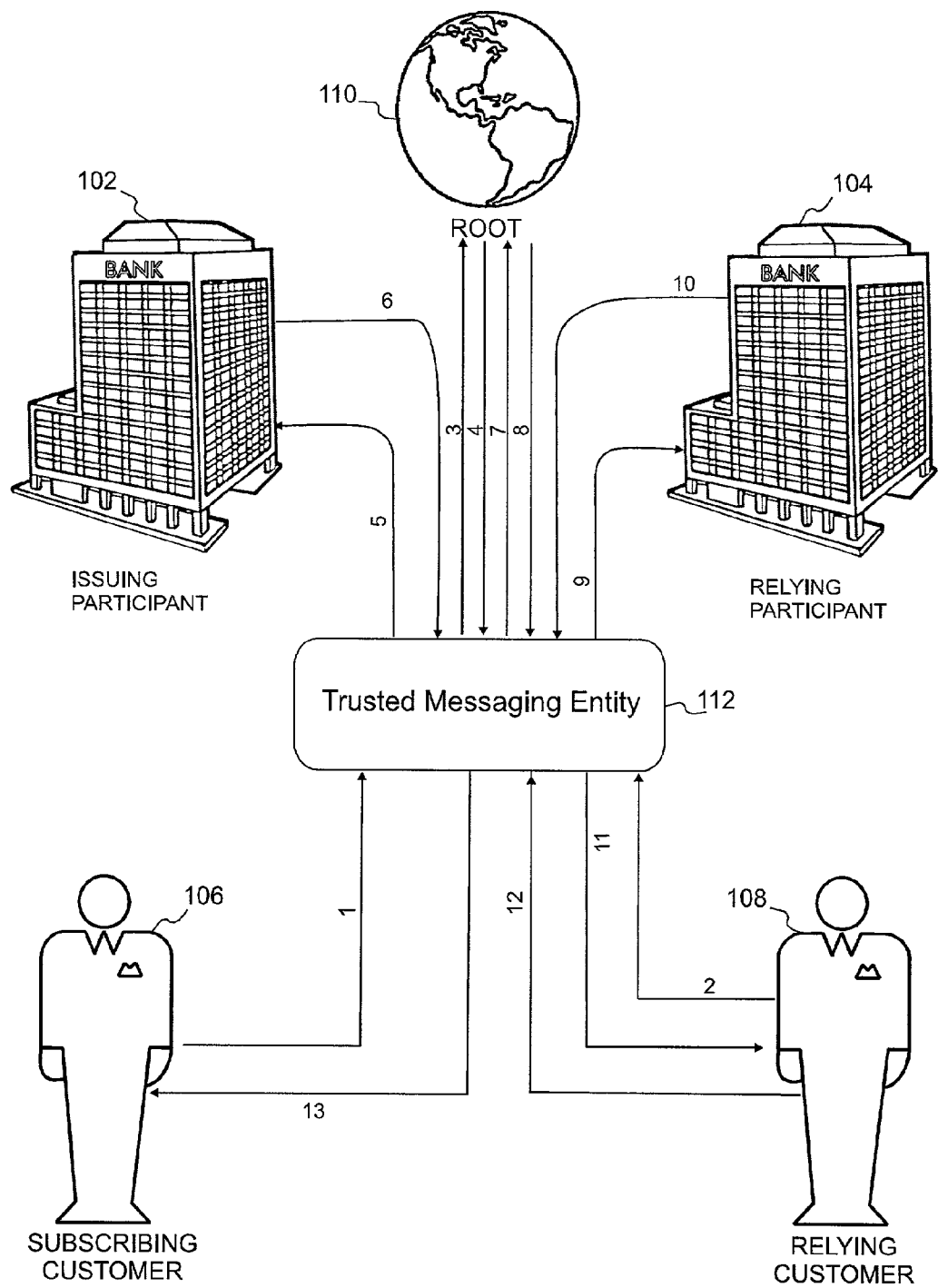
FIG. 6 illustrates a preferred embodiment of certain messages used in the preferred embodiment of FIG. 5.

In step 504, browser 224 transmits the digitally-signed document to trusted messaging entity 112 over the Internet via trusted services platform $130_{SC}$ (message 1 in FIG. 6). If, in step 503 above, subscribing customer 106 received a copy of relying customer 108's digital certificate with, or as part of, the data to be signed, subscribing customer 106 includes this certificate with the digitally-signed document transmitted to trusted messaging entity 112. Otherwise, in step 505, relying customer 108 transmits a copy of its certificate directly to trusted messaging entity 112 (message 2 in FIG. 6).

In step 506, trusted messaging entity 112 identifies the issuing participant and relying participant for the particular transaction from the subscribing customer and relying customer certificates, respectively. In step 507, trusted messaging entity 112 verifies subscribing customer 106's signature on the document (using subscribing customer 106's public key) and the signatures on subscribing customer 106's and relying customer 108's certificates (using the public keys of issuing participant 102 and relying participant 104, respectively).

In step 508, trusted messaging entity 112 retrieves from certificate repository 304 its OCSP-signing certificate. In contrast to the first preferred embodiment described above, in this second preferred embodiment trusted messaging entity 112 is provided with only one OCSP-signing certificate which it uses in requesting certificate validations.

In step 509, trusted messaging entity 112 creates a certificate validation request for issuing participant 102's certificate, signs the request with the private key associated with its OCSP-signing certificate and transmits the request to root entity 110 (message 3 in FIG. 6). In a preferred embodiment, trusted messaging entity 112 acts as a principal in signing this message. In an alternative preferred embodiment, trusted messaging entity 112 acts as an agent acting for an undisclosed principal in signing this message, where the undisclosed principal is relying participant 104.

In step 510, root entity 110 checks the validity of the issuing participant 102's certificate using its OCSP responder $204_R$. In step 511, root entity 110 transmits the validation response for this certificate to trusted messaging entity 112 (message 4 in FIG. 6).

In step 512, trusted messaging entity 112 creates a certificate validation request for subscribing customer 106's certificate, signs the request with the private key associated with its OCSP-signing certificate and transmits the request to issuing participant 102 (message 5 in FIG. 6). In a preferred embodiment, trusted messaging entity 112 acts as a principal in signing this message. In an alternative preferred embodiment, trusted messaging entity 112 acts as an agent acting for an undisclosed principal in signing this message, where the undisclosed principal is relying participant 104.

In step 513, issuing participant 102 checks the validity of subscribing customer 106's certificate using its OCSP responder $204_{IP}$. In step 514, issuing participant 102 transmits the validation response for this certificate to trusted messaging entity 112 (message 6 in FIG. 6).

In step 515, trusted messaging entity 112 creates a certificate validation request for relying participant 104's certificate, signs the request with the private key associated with its OCSP-signing certificate and transmits the request to root entity 110 (message 7 in FIG. 6). In a preferred embodiment, trusted messaging entity 112 acts as a principal in signing this message. In an alternative preferred embodiment, trusted messaging entity 112 acts as an agent acting for an undisclosed principal in signing this message, where the undisclosed principal is issuing participant 102.

In step 516, root entity 110 checks the validity of the relying participant 104's certificate using its OCSP responder $204_R$. In step 517, root entity 110 transmits the validation response for this certificate to trusted messaging entity 112 (message 8 in FIG. 6).

In step 518, trusted messaging entity 112 creates a certificate validation request for relying customer 108's certificate, signs the request with the private key associated with its OCSP-signing certificate and transmits the request to relying participant 104 (message 9 in FIG. 6). In a preferred embodiment, trusted messaging entity 112 acts as a principal in signing this message. In an alternative preferred embodiment, trusted messaging entity 112 acts as an agent acting for an undisclosed principal in signing this message, where the undisclosed principal is issuing participant 102.

In step 519, relying participant 104 checks the validity of relying customer 108's certificate using its OCSP responder $204_{RP}$. In step 520, relying participant 104 transmits the validation response for this certificate to trusted messaging entity 112 (message 10 in FIG. 6).

In step 521, trusted messaging entity 112 determines whether the validation responses received from root entity 110, issuing participant 102, and relying participant 104 are positive. If one or more of the validation responses are not positive, trusted messaging entity 112 transmits a message (not shown) to subscribing customer 106 conveying this fact and informing subscribing customer 106 that its digitally-signed document will not be delivered to relying customer 108 (step 522).

Otherwise, in step 523, trusted messaging entity 112 retrieves from certificate repository 304 its customer-communication certificate issued to it by relying participant 104 (hereafter "RP-customer-communication certificate"). In step 524, trusted messaging entity 112 creates a message confirming the validity of the subscribing customer 106's digital certificate, signs the message with the private key corresponding to its RP-customer-communication certificate, appends the message confirming validity to the digitally-signed document to form a validated document, and transmits the validated document to relying customer 108 (message 11 in FIG. 6). In signing this message, trusted messaging entity 112 preferably acts as an agent for relying participant 104.

In step 525, relying customer 108 generates a receipt for the transaction and digitally signs it. In step 526, relying customer 108 transmits the digitally-signed receipt to trusted messaging entity 112 (message 12 in FIG. 6).

In step 527, trusted messaging entity 112 retrieves from certificate repository 304 its customer-communication certificate issued to it by issuing participant 102 (hereafter "IP-customer-communication certificate"). In step 528, trusted messaging entity creates a message confirming the validity of the relying customer 108's digital certificate, signs the message with the private key corresponding to its IP-customer-communication certificate, appends the message confirming validity to the digitally-signed receipt to form a validated receipt, and transmits the validated receipt to subscribing customer 106 (message 13 in FIG. 6). In signing this message, trusted messaging entity 112 preferably acts as an agent for issuing participant 102. In a preferred embodiment, trusted messaging entity 112 may revalidate the relying customer's certificate with relying participant 104 before generating the validated receipt and forwarding it to subscribing customer 106.

Comparison of Preferred Embodiment No. 1 and Preferred Embodiment No. 2

Both the first and second preferred embodiments described above transparently validate a subscribing customer certificate during a transaction without requiring a validation request by either the subscribing customer or relying customer. Moreover, the two embodiments provide each party to a transaction with validation of its counterparty's certificate. Furthermore, in both embodiments, the validation messages transmitted to the subscribing customer and relying customer are signed with private keys associated with respective digital certificates that name an entity trusted by the customer receiving the validation message, i.e., its participant.

But the two preferred embodiments also differ substantially, in both technical effect and legal respects. In terms of technical effect, in the first preferred embodiment, trusted messaging entity 112 is issued participant-specific OCSP-signing certificates, preferably one for each participant in the present system. By contrast, in the second preferred embodiment, trusted messaging entity 112 is issued only one OCSP-signing certificate, which it uses to sign all validation requests.

Moreover, from a legal perspective, in the first preferred embodiment, when trusted messaging entity 112 creates and transmits validation requests for subscribing customer 106's certificate and issuing participant 102's certificate, it acts as an agent for relying participant 104. Similarly, when trusted messaging entity 112 creates and transmits validation requests for relying customer 108's certificate and relying participant 102's certificate, it acts as an agent for issuing participant 102. By contrast, in the second preferred embodiment, when trusted messaging entity 112 creates and transmits validation requests for subscribing customer 106's certificate, relying customer 108's certificate, issuing participant 102's certificate, or relying participant 104's certificate, it acts either as a principal within the system or as an agent acting on behalf of an undisclosed principal.

These technical and legal distinctions between the two embodiments can have significant effects on the system's operation and liability model. When trusted messaging entity 112 acts as principal in the present system it acquires direct liability to other system entities for damages suffered as a result of negligent or intentional errors committed by trusted messaging entity 112. As noted above, in a preferred embodiment, root entity 110 preferably develops a set of operating rules for the present system that define the rights, obligations, and liabilities of each system entity in connection with provision of system services. If, as in one version of the second preferred embodiment described above, trusted messaging entity 112 acts as a principal within the system, it will typically be necessary to create an additional section of such operating rules that define the rights and obligations of trusted messaging entity 112 in the present system.

Moreover, under the law of agency, even if, as in the second version of the second preferred embodiment described above, trusted messaging entity 112 acts as agent for an undisclosed principal, trusted messaging entity 112 will typically acquire direct liability to system entities with which it interacts that it would not acquire if acting as agent for a disclosed principal, as described below. In addition, if no steps are taken to clarify the status of trusted messaging entity 112, it may be unclear whether it is acting as a principal or as an agent for an undisclosed principal when taking a given action, which may lead to further ambiguities concerning its liability to other system entities.

By contrast, in the first preferred embodiment described above, trusted messaging entity 112 acts as agent for a disclosed principal in requesting validation of digital certificates. In this preferred embodiment, under the law of agency, the liability of trusted messaging entity 112 will typically be limited to liability to its principal; the counterparty will have recourse only against that principal, not its agent. Liability between agent and principal can be addressed by appropriate contracts between them. Moreover, the contracts apportioning liability between agent and principal may be tailored to the desires of the particular parties to the contract. Thus, for example, trusted messaging agent 112 could establish one arrangement for apportioning liability with a first participant and a second arrangement for apportioning liability with a second participant. In contrast, in an embodiment in which trusted messaging entity 112 assumes liability to other system entities (as in the first preferred embodiment), the scope of such liability is typically best addressed in the system operating rules and would therefore typically apply uniformly to trusted messaging entity 112's relationships with all system participants.

Furthermore, because trusted messaging entity 112 uses a participant-specific certificate to request certificate validations, the principal on whose behalf it is acting is always clear. This is especially beneficial because trusted messaging entity 112 may in quick succession request validation for a plurality of certificates from a plurality of entities acting in the various requests as agent for different principals. The use of participant-specific certificates thus provides a simple and efficient mechanism to clearly disclose and track the principal on whose behalf trusted messaging entity 112 is acting when it takes a given action.

This ability to identify and track the entity for whom trusted messaging entity 112 is acting may be especially beneficial to root entity 110. For example, root entity 110 may want or be obligated under the operating rules to count the number of validation requests that it receives on behalf of each system participant (e.g., participant's 102, 104). If trusted messaging entity 112 uses a single OCSP-signing certificate for all validation requests to root entity 110, root entity 110 will be unable to allocate those requests among the various system participants on whose behalf they were made.

It should be recognized that although the steps in the process flows for the first and second preferred embodiments described above are described in a particular order, the steps may be performed in other orders in alternative preferred embodiments. For example in one alternative embodiment trusted messaging entity 112 may validate the certificates of issuing participant 102 and subscribing customer 106 before obtaining a copy of the certificate of relying customer 108. It should also be recognized that some of the steps described above as distinct may be implemented as a single step. For example, a single request to root entity 110 may be defined requesting validation of both issuing participant 102's and relying participant 104's certificates.

Additional System Services

In a preferred embodiment, the above-described architecture may serve as a platform for providing other system services in addition, or as alternatives, to the certificate validation service described above. For example, the architecture may be used to provide a warranty service in which a system entity financially guarantees the identity of a subscribing customer and promises to reimburse a relying customer for losses that it suffers as a result of reliance on the subscribing customer's digital signature.

The above-described architecture may also be used to provide payment-guarantee and performance-guarantee services. In a preferred embodiment, a payment-guarantee service may be used by a relying customer 108 to obtain a guarantee from an entity that it trusts that a subscribing customer 106 will honor a financial obligation. In a preferred embodiment, a performance-guarantee service may be used by a subscribing customer 106 to obtain a guarantee from an entity that it trusts that relying customer 108 will honor an obligation that it undertakes to perform.

Logging and Non-Repudiation

In a preferred embodiment, trusted messaging entity 112 time stamps and logs each service message that it sends or receives, for non-repudiation purposes. Accordingly, trusted messaging entity 112 logs data for ensuring non-repudiation of a service performed within the context of the present system. For example, if an issuing participant denies having validated the identity of a subscribing customer, the logs maintained by the trusted messaging entity may be consulted to determine whether a signed validation response for the subscribing customer was issued by the issuing participant. In another example, if a relying customer denies having received a digitally-signed document, the logs maintained by the trusted messaging entity may be consulted to determine whether a signed receipt for the document was received from the relying customer.

While the invention has been described in conjunction with specific embodiments, it is evident that numerous alternatives, modifications, and variations will be apparent to those skilled in the art in light of the foregoing description.

What is claimed is:

1. A method for providing one or more services via a network comprising:

receiving at a trusted messaging entity a digitally-signed document;

identifying a subscribing customer that digitally signed the document;

identifying an issuing participant associated with the subscribing customer;

identifying a relying customer that is intending to rely on the digitally-signed document;

identifying a relying participant associated with the relying customer;

transmitting a first validation request for a digital certificate of the issuing participant to a root entity, the first validation request being signed with a private key associated with a first digital certificate that names the relying customer;

receiving a validation response for the first validation request from the root entity;

transmitting a second validation request for a digital certificate of the subscribing customer to the issuing participant, the second validation request being signed with a private key associated with the first digital certificate that names the relying customer;

receiving a validation response for the second validation request from the issuing participant;

transmitting a third validation request for a digital certificate of the relying participant to the root entity, the third validation request being signed with a private key associated with a first digital certificate that names the subscribing customer;

receiving a validation response for the third validation request from the root entity; transmitting a fourth validation request for a digital certificate of the relying customer to the relying participant, the fourth validation request being signed with a private key associated with the first digital certificate that names the subscribing customer;

receiving a validation response for the fourth validation request from the relying participant;

determining whether the first, second, third, and fourth validation responses are positive;

if the first, second, third, and fourth validation responses are positive, creating a first digitally-signed message that indicates the validity of the subscribing-customer digital certificate, the first digitally-signed message being created using a private key associated with a second digital certificate that names the relying participant;

transmitting the digitally-signed document and the digitally-signed message to the relying customer.

2. The method of claim 1, wherein the first validation request is made by the trusted messaging entity acting on behalf of a disclosed principal, and wherein the disclosed principal is the relying participant.

3. The method of claim 1, wherein the second validation request is made by the trusted messaging entity acting on behalf of a disclosed principal, and wherein the disclosed principal is the relying participant.

4. The method of claim 1, wherein the third validation request is made by the trusted messaging entity acting on behalf of a disclosed principal, and wherein the disclosed principal is the issuing participant.

5. The method of claim 1, wherein the fourth validation request is made by the trusted messaging entity acting on behalf of a disclosed principal, and wherein the disclosed principal is the issuing participant.

6. The method of claim 1, wherein the first digitally-signed message is made by the trusted messaging entity acting on behalf of a disclosed principal, and wherein the disclosed principal is the relying participant.

7. The method of claim 1, further comprising:
receiving a digitally-signed receipt from the relying customer;
creating a second digitally-signed message that indicates the validity of the relying customer digital certificate, the second digitally-signed message being created using a private key associated with a second digital certificate that names the issuing participant; and
transmitting the digitally-signed receipt and the second digitally-signed message to the relying customer.

8. The method of claim 7, wherein the second digitally-signed message is made by the trusted messaging entity acting on behalf of a disclosed principal, and wherein the disclosed principal is the issuing participant.

9. The method of claim 7, wherein the first digital certificate that names the issuing participant and the second digital certificate that names the issuing participant are the same digital certificate.

10. The method of claim 1, wherein the first digital certificate that names the relying participant and the second digital certificate that names the relying participant are the same digital certificate.

11. The method of claim 1, wherein the first, second, third, and fourth validation requests are formatted in accordance with the Online Certificate Status Protocol.

12. A system for providing one or more services via a network comprising:
a receiver to receive a digitally signed document at a trusted messaging entity;
a subscribing customer identifier for identifying a subscribing customer that digitally signed the document;
an issuing participant identifier for identifying an issuing participant associated with the subscribing customer;
a relying customer identifier for identifying a relying customer that is intending to rely on the digitally signed document;
a relying participant identifier for identifying a relying participant associated with the relying customer;
a first validation request transmitter for transmitting a first validation request for a digital certificate of the issuing participant to a root entity, the first validation request being signed with a private key associated with a first digital certificate that names the relying customer;
a first validation response receiver for receiving a validation response for the first validation request from the root entity;
a second validation request transmitter for transmitting a second validation request for a digital certificate of the subscribing customer to the issuing participant, the second validation request being signed with a private key associated with the first digital certificate that names the relying customer;
a second validation response receiver for receiving a validation response for the second validation request from the issuing participant;
a third validation request transmitter for transmitting a third validation request for a digital certificate of the relying participant to the root entity, the third validation request being signed with a private key associated with a first digital certificate that names the subscribing customer;
a third validation request receiver for receiving a validation response for the third validation request from the root entity;
a fourth validation request transmitter for transmitting a fourth validation request for a digital certificate of the relying customer to the relying participant, the fourth validation request being signed with a private key associated with the first digital certificate that names the subscribing customer;
a fourth validation request receiver for receiving a validation response for the fourth validation request from the relying participant;
a validation response analyzer for determining whether the first, second, third, and fourth validation responses are positive;
a first digitally-signed message generator for creating a first digitally-signed message that indicates the validity of the subscribing-customer digital certificate if the first, second, third, and fourth validation responses are positive, the first digitally-signed message being created using a private key associated with a second digital certificate that names the relying participant;
a first digitally-signed message transmitter for transmitting the digitally-signed document and the first digitally-signed message to the relying customer.

13. The system of claim 12, wherein the first validation request is made by the trusted messaging entity acting on behalf of a disclosed principal, and wherein the disclosed principal is the relying participant.

14. The system of claim 12, wherein the second validation request is made by the trusted messaging entity acting on behalf of a disclosed principal, and wherein the disclosed principal is the relying participant.

15. The system of claim 12, wherein the third validation request is made by the trusted messaging entity acting on behalf of a disclosed principal, and wherein the disclosed principal is the issuing participant.

16. The system of claim 12, wherein the fourth validation request is made by the trusted messaging entity acting on behalf of a disclosed principal, and wherein the disclosed principal is the issuing participant.

17. The system of claim 12, wherein the first digitally-signed message is made by the trusted messaging entity acting on behalf of a disclosed principal, and wherein the disclosed principal is the relying participant.

18. The system of claim 12, further comprising:

a digitally-signed receipt receiver for receiving a digitally-signed receipt from the relying customer;

a second digitally-signed message generator for creating a second digitally-signed message that indicates the validity of the relying-customer digital certificate, the second digitally-signed message being created using a private key associated with a second digital certificate that names the issuing participant; and a second digitally-signed message transmitter for transmitting the digitally-signed receipt and the second digitally-signed message to the relying customer.

19. The system of claim 18, wherein the second digitally-signed message is made by the trusted messaging entity acting on behalf of a disclosed principal, and wherein the disclosed principal is the issuing participant.

20. The system of claim 18, wherein the first digital certificate that names the issuing participant and the second digital certificate that names the issuing participant are the same digital certificate.

21. The system of claim 18, wherein the first digital certificate that names the relying participant and the second digital certificate that names the relying participant are the same digital certificate.

22. The system of claim 18, wherein the first, second, third, and fourth validation requests are formatted in accordance with the online Certificate Status Protocol.

* * * * *